United States Patent Office 3,813,382
Patented May 28, 1974

3,813,382
ANALOGS OF LUTEINIZING HORMONE RELEASING FACTOR SUBSTITUTED IN POSITION 9
Wayne A. McKinley, Wallingford, and William H. McGregor, Malvern, Pa., assignors to American Home Products Corporation, New York, N.Y.
No Drawing. Filed Dec. 20, 1972, Ser. No. 317,041
Int. Cl. C07c 103/52; C07g 7/00
U.S. Cl. 260—112.5     5 Claims

ABSTRACT OF THE DISCLOSURE

Novel decapeptides are described in which the decapeptide pGlu - His - Trp-Ser-Tyr-Gly-Leu-Arg-Pro-Gly-NH$_2$ identified as the luteinizing hormone-releasing factor has the amino acid in the 9-position of the peptide chain replaced by an aliphatic amino acid. The resulting decapeptides have both luteinizing hormone (LH-RF) releasing factor and follicle-stimulating hormone-releasing factor (FSH-RF) activity.

---

This invention relates to novel decapeptides, processes for their preparation and uses for such peptides.

With the last two years the isolation from porcine hypothalami of the peptide hormone which controls the secretion of both luteinizing hormone (LH) and follicle-stimulating hormone (FSH) from the pituitary gland has been reported. The amino acid sequence of this hypothalamic hormone designated LH-releasing hormon/FSH-releasing hormone (LH-RH/FSH-RH) has been established to be pGlu-His-Trp-Ser-Tyr-Gly-Leu-Arg-Pro-Gly-NH$_2$. See Sievertsson et al.—J. Med. Chem., 15, 222, (1972); Matsuo et al.—Biochemical and Biophysical Research Communications, 45, 822, (1971); Geiger et al.—Biochemical and Biophysical Research Communications, 45, 767, (1971); Rivaille et al.—Helv. Chim. Acta, 54, 2772 (1971). This decapeptide has also been made synthetically.

The present invention relates to structural modification of the decapeptide pGlu-His-Trp-Ser-Tyr-Gly-Leu-Arg-Pro-Gly-NH$_2$ at the nine position of the peptide chain to provide novel decapeptides having leuteinizing hormone and follicle-stimulating hormone releasing factor activity (LH-RF/FSH-RF).

The novel decapeptides of the present invention are represented by the formula:

p-Glu-His-Trp-Ser-Tyr-Gly-Leu-Arg-X-Gly-NH$_2$ wherein X is a radical selected from the class consisting of

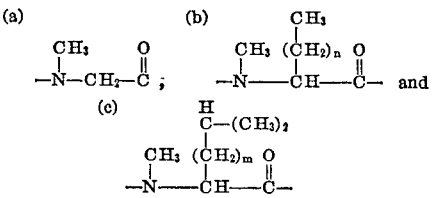

wherein $n$ is a number from 0 through 3; $m$ is a number which is 0 or 1. The radicals defined by X are derived from amino acids such as N-methyl glycine, N-methyl alanine, N-methyl α-aminobutyric acid, N-methyl norleucine, N-methyl valine and N-methyl leucine. Preferably, X is

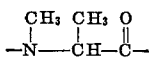

The decapeptides of the present invention may be in the form of the free base or a non-toxic salt thereof. Illustrative of pharmaceutically-acceptable acid-addition salts are hydrochloride, hydrobromide, sulfate, phosphate, maleate, acetate, citrate, benzoate, succinate, malate, ascorbate and the like.

The decapeptides of the present invention may be prepared using solid phase synthesis. The synthesis is commenced from the C-terminated end of the decapeptide using an α-amino protected glycine resin. Such a starting material can be prepared by attaching an α-amino protected glycine to a chloromethylated resin in accordance with procedures described in the art. The α-amino- protecting group is preferably tert butyloxycarbonyl (tert-Boc) which protecting group is also preferably used for protecting the α-amino group of all the amino acids added stepwise in the synthesis of the decapeptide. However, other known α-amino protecting groups can be used throughout the synthesis such as o-nitrophenylsulfenyl, t-amyloxycarbonyl, and biphenylisopropyloxycarbonyl. The α-amino protecting group must be stable enough to withstand the conditions of activation and coupling but labile enough to be quickly removed under conditions which do not affect the side chain protecting groups. Side chain protecting groups which protect either an alcoholic hydroxy group, an aromatic hydroxy group or side chain nitrogen atoms are used on the amino acids arginine, tyrosine, sersine, serine and histidine introduced into the stepwise syntheses of the decapeptide. Illustrative of suitable side chain groups are benzyl, tosyl, t-amyloxycarbonyl and nitro. Other side chain protecting groups for these amino acids are illustrated by Schroder & Lubke in their text, "The Peptides," 1 at pages 251, 253, 264, 266–67 (Academic Press 1965) the disclosure of which is incorporated herein by reference.

The addition of each protected amino acid is accompanied by removal of the α-amino blocking group using trifluoroacetic acid in methylene chloride or HCl in dioxane. Other art recognized reagents for removing α-amino protecting groups may be used including glacial acetic acid, etc. The deprotection of the α-amino group is carried out at a temperature between about 0° C. and room temperature. Other standard cleaving reagents and conditions for removal of different α-amino protecting groups are described in the Schroder & Lubke text supra, pages 72–75.

Following the step wise addition of all ten amino acids starting from the C-terminated end, the resulting decapeptide anchored to the resin is converted to the corresponding decapeptide amide and split off from the resin by ammonolysis in an alcoholic solution. Alternatively, the decapeptide may be separated from the resin by methanolysis after which the recovered product is chromatographed on silica gel as described in Example 1(b). The collected fraction is then subjected to ammonolysis to form the C-terminated amide. Thereafter, the side chain protecting groups are removed by treatment with hydrogen fluoride in the presence of anisole. The side-chain protecting groups may be removed by other procedures known in the art such as catalytic reduction (e.g. Pd on BaSO$_4$) using conditions which will keep the Trp moiety intact.

Other modifications in the synthesis may be made. For example, other solid resins may be used in place of a chloromethylated resin such as benzylhydrylamine solid support. The preparation of this resin support for use in peptide synthesis is described by Monahan et al., Biochemical and Biophysical Research Communications, 48, pp. 1100–1105 (1972).

The following example is illustrative of the preparation of the decapeptides of the present invention.

(a) L - pyroglutamyl-N$^{im}$-tosyl-L-histidyl-L-tryptophyl-O-benzyl-L-seryl-O-benzyl-L-tyrosylglycyl-L-leucyl-N$^{guan}$-NO$_2$-L-arginyl-N-methyl-L-alanylglycyl-resin Chloromethylated polystyrene-2% divinyl-benzene polymer (6 g., 3.7 mmole Cl/gm.), 1.05 g. (6 mmole) t-butyloxycarbonyl-glycine and 0.75 ml. (5.4 mmole) of triethylamine are gently shaken in a closed reaction vessel for 72 hours at ambient temperature.

The resin is filtered and washed in turn with dimethylformamide, ethanol, acetic acid, ethanol and methylene chloride allowing at least three minutes contact time with the resin at each step. The resin is then dried *in vacuo* over KOH for 24 hours. Nitrogen analysis of the dried polymer indicates approximately 0.6 mmole of boc-glycine per gram of resin.

Six grams of the boc-glycyl resin (containing a total of 3.6 mmole of boc-glycine) are introduced into a solid phase reaction vessel and the following steps with the exceptions as indicated herein accompanied the consecutive introduction of each of the following tert-Boc amino acid residue; namely, N-methylalanine, arginine ($NO_2$), leucine, glycine, tyrosine(O-benzyl), serine(O-benzyl), tryptophan, histidine (p-toluenesulfonyl) and p-glutamic acid.

(1) Deprotection with 70 ml. of 30% trifluoroacetic acid in methylene chloride for 30 min. at ambient temperature; (2) Three washings with 60 ml. of methylene chloride; (3) Neutralization of the trifluoroacetate salt of the peptide resin with 70 ml. of 15% triethylamine in methylene chloride for 10 min. at ambient temperature; (4) Five washings with 60 ml. of methylene chloride each; (5) Addition of 6 mmoles of the appropriate boc-amino acid in 70 ml. of methylene chloride (containing 5 ml. ethanol) and shaking for 10 min.; (6) Addition of 1.48 g. (6 mmole) N-ethoxycarbonyl-2-ethoxy-1,2-dihydroquinoline followed by shaking for 18 hrs. at ambient temperature; (7) Five washings with 60 ml. of methylene chloride each.

For the coupling of $N^\alpha$Boc-$NO_2$-L-arginine steps (5) and (6) are carried out using as solvent 30 ml. of ethanol and 40 ml. of methylene chloride and repeated once using half quantities of reactants. The coupling of L-pyroglutamic acid (step 5) is carried out in 60 ml. of 1:1 dimethylformamide-methylene chloride.

The success of the coupling reactions were monitored by the ninhydrin reaction as described by *Kaiser et al.*—Anal. Bio-chem., *34*, 595, (1970).

(b) L - pyroglutamyl-$N^{im}$-tosyl-L-histidyl-L-tryptophyl-O-benzyl-L-seryl-O-benzyl-L-tyrosylglycyl-L-leucyl-$N^{guan}$-$NO_2$-L-arginyl-N-methyl-L-alanylglycinamide The protected decapeptide-resin obtained in (a) is stirred in 100 ml. of 4:1 methanol-triethylamine for 18 hours. The resin is filtered and this treatment is repeated. The combined filtrates are concentrated under reduced pressure 30° C. to a light yellow colored solid (0.91 g.). This product is chromatographed on silica gel in 2:1 chloroform/methanol collecting the Erhlich positive material with $R_f$ about 0.5 in the same solvent system on silica gel TLC (0.46 g. of light yellow solid).

This fraction is dissolved in 100 ml. of methanol saturated with anhydrous ammonia at 0° C. and allowed to react for 7 days at 4° C. The solution is concentrated to a solid and chromatographed on alumina preparative thin layer plates with the solvent system 3:1 chloroform/methanol. The fraction with $R_f$ 0.75 is eluted with the same solvent giving a light yellow-colored solid (60 mgs.).

(c) L - pyroglutamyl-L-histidyl-L-tryptophyl-L-seryl-L-tyrosylglycyl-L-leucyl-L-arginyl-N-methyl-L-alanylglycinamide Deprotection of the decapeptide amide obtained in (b) is achieved in hydrogen fluoride at 0° C. for 1 hr. in the presence of 0.2 ml. of anisole. The product is dissolved in acetic acid and lyophilized to a powder, is converted to the acetate salt by passing it through a column of Bio-Rad AG 1 x 8 in the acetate form. Preparative thin layer chromatography (cellulose, 1-butanol, water, acetic acid 4:2:1) and elution of the fraction with $R_f$ 0.5 with 1% acetic acid gives 20 mg. of slightly yellow colored solid on lyophylization.

The compound of Example 1 has been found to have leuteinizing hormone-releasing activity equal to about 10% of the activity exhibited by the hypothalmic hormone, designated LH-releasing hormone/FSH-releasing hormone. The leuteinizing hormone activity was determined by a modification of the one-ovary, 4 hr., ovarian ascorbic acid depletion (OAAD) method of Parlow described in "Assay and Properties of Gonadotrophins in Pituitary Tissue: *In Human Pituitary Gonadotrophins*," Chapter 8, pp. 300–311, (Charles C. Thomas, Springfield, Ill., 1961).

Twenty-five-day-old Holtzman rats are prepared for bioassay a follows: Fifty international units (IU) of pregnant mare's serum (PMS) (Equinex, Ayerst) are administered subcutaneously at 4:00 p.m. in 0.2 ml. saline. At 28 days of age, at 8:30 a.m., the rats are given 25 IU of human chorionic gonadotrophin (HCG) (APL, Ayerst) subcutaneously in 0.2 ml. saline. At 34 days of age the test compounds and standards are administered intravenously in the tail in a 1.0 ml. volume of saline to each of 5 animals per group. For a reference standard, National Institute of Health-LH (NIH-LH) is administered at doses of 0.4, 1.6, and 6.4 g. per rat. Four hours following reference or test compound administration, the right ovary is removed, weighed, and homogenized in a mixture of 0.2% oxalic acid and 2.0% trichloroacetic acid. The homogenate is centrifugated at 1500 r.p.m. for 20 minutes at 4° C. The amount of ovarian ascorbic acid in the entire sample is determined by the method of Schmall, Pifer, and Wollish, Anal. Chem. 25: 1486 (1953).

The equivalent amount of LH in each test animal is calculated from the amount of ovarian ascorbic acid per mg. of ovarian tissue plotted against the standard and is expressed in microgram equivalents of NIH-LH.

What is claimed is:

1. A member selected from the group having the formula p - L - Glu-L-His-L-Trp-L-Ser-L-Tyr-Gly-L-Leu-L-Arg-L-X-Gly-$NH_2$ wherein:

X is selected from the class consisting of

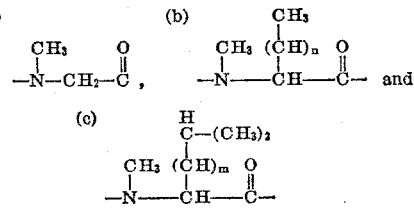

$n$ is a number selected from 0, 1 and 3; and $m$ is a number which is 0 or 1; and the non-toxic addition salts thereof.

2. A compound according to claim 1 wherein X is

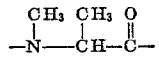

3. A compound according to claim 1 which is L-pyroglutamyl - L - histidyl - L - tryptophyl-L-seryl-L-tyrosylglycyl - L - leucyl-L-arginyl-N-methyl-L-alanylglycinamide.

4. The compound L-pyroglutamyl-$N^{im}$-tosyl-L-histidyl-L - tryptophyl-O-benzyl-L-seryl-O-benzyl-L-tyrosylglycyl-L-leucyl - $N^{guan}$-$NO_2$-L-arginyl-N-methyl-L-alanylglycinamide.

5. The compound L-pyroglutamyl-$N^{im}$-tosyl-L-histidyl-L - tryptophenyl - O - benzyl-L-seryl-O-benzyl-L-tyrosylglycyl-L-leucyl-$N^{guan}$-$NO_2$-L-arginyl - N - methyl-L-alanylglycine methylester.

References Cited

Coy et al.: J. Med. Chem., 16, 83–4 (1973).
Chang et al.: J. Med. Chem., 15, 623–7 (1972).

ELBERT L. ROBERTS, Primary Examiner

R. J. SUYAT, Assistant Examiner

U.S. Cl. X.R.

424—177

UNITED STATES PATENT OFFICE
CERTIFICATE OF CORRECTION

Patent No. 3,813,382　　　　　Dated May 28, 1974

Inventor(s) Wayne A. McKinley and William H. McGregor

It is certified that error appears in the above-identified patent and that said Letters Patent are hereby corrected as shown below:

column 1, line 24, change "With" to --Within--;

column 1, line 29, change "hormon" to --hormone--;

column 2, line 22, delete "sersine";

column 4, line 12, change "a" to --as--;

column 4 (claim 1), change the formula defined in (b) to

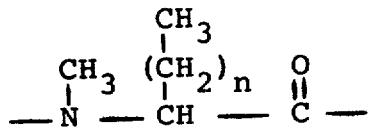

column 4 (claim 1), change the formula defined in (c) to

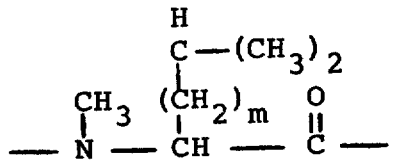

Signed and sealed this 14th day of January 1975.

(SEAL)
Attest:

McCOY M. GIBSON JR.
　Attesting Officer

C. MARSHALL DANN
　Commissioner of Patents